May 28, 1968 J. W. HOLTER 3,385,300
CERVICAL CANNULA
Filed Aug. 10, 1965

INVENTOR
JOHN W. HOLTER
BY
*Busser Smith & Harding*
ATTORNEYS

United States Patent Office 3,385,300
Patented May 28, 1968

3,385,300
CERVICAL CANNULA
John W. Holter, Gulph Mills, Pa., assignor to The Holter Company, Bridgeport, Pa., a corporation of Pennsylvania
Filed Aug. 10, 1965, Ser. No. 478,699
9 Claims. (Cl. 128—348)

ABSTRACT OF THE DISCLOSURE

A cervical cannula comprising a tapered cone made of flexible material and having a pointed end and a blunt end, thread means molded onto the cone for easy insertion of the cone into a cervical canal and for retention and sealing of the cone therein, said thread means including a helical thread having teeth with front and rear faces extending along the cone, with the front faces of the teeth slanting toward the blunt end of the cone for easy insertion, and the rear faces of the teeth slanting toward the blunt end of the cone to aid in retention of the cone in the cervical canal, a tube extending from the blunt end of the cone to an open end through which may be passed fluids, and an opening in the pointed end of the cone for passing the fluids into the cervical canal. A stylus of bendable metal is provided for inserting the cannula, and a criss-cross fabric is molded onto the outside of the tube to aid in transmitting torque from the open end of the tube to the cone.

---

This invention relates to a cannula, and more particularly concerns a cervical cannula which is adapted to provide communication from the female external genitalia to the internal genitalia by establishing a fluid passageway to the cervical canal. The cannula is well tolerated by the body tissues.

It is an object of this invention to provide a cervical cannula which effectively seals the cervical canal against feedback of fluids inserted into the canal through the cannula. Such fluids may be a gas such as carbon dioxide, or may be a medicinal liquid, a contrast-study medium, or the like. In cannulas of conventional construction such fluids may return from the cervical canal through the space between the cannula and the cervical canal tissues, especially when the fluid is under pressure in the canal. This fluid return is undesirable.

It is another object of this invention to provide a cannula which may be inserted into the cervical canal with much less discomfort than previous devices. It is another object to provide a cannula which may be left in place for long periods, making possible therapy of long duration.

Other objects and advantages of this invention, including its simplicity and economy, will further become apparent hereinafter and in the drawings, in which.

Figure 1:
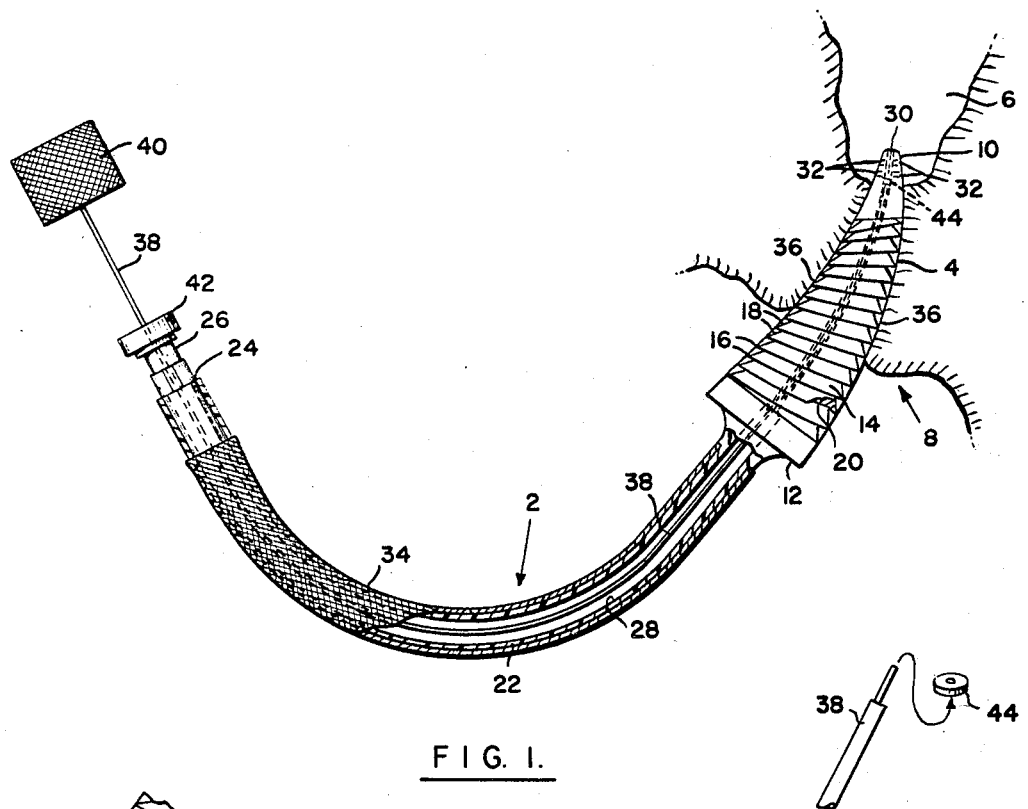
FIG. 1 is a view partly in section of a cervical cannula constructed in accordance with this invention and shows the cannula in place in a cervical canal.

Turning now to the specific embodiments of the invention selected for illustration in the drawings, there is shown in FIG. 1 a cervical cannula 2 which is positioned in a cervical canal 4 which leads to a uterus 6. Cannula 2 comprises a tapered cone 8 made of flexible material which has a pointed end 10 and a blunt end 12. Thread means which includes a helical thread 14 is molded onto cone 8 for easy insertion of the cone into a cervical canal by rotating the cone. Thread 14 also provides for retention and sealing of the cone in the canal. Helical thread 14 includes teeth 16 having front faces 18 and rear faces 20, with front faces 18 slanting toward blunt end 12 of cone 8, and rear faces 20 also slanting in that direction. The slanting front faces 18 of teeth 16 provide for easy insertion of the cannula into the cervical canal 4, and the rearwardly slanting rear faces 20 oppose rearward movement and aid in retaining the cannula in the canal.

A tube 22 extends from blunt end 12 to an open end 24 through which may pass fluids. Open end 24 has inserted therein a metal connector cap 26 which is internally threaded and is provided with flattened outside surfaces for easier turning of cap 26 and tube 22. Pointed end 10 of cone 8 is provided with openings that lead to a passageway 28 which extends from one end of the cannula to the other. The openings include an axial port 30, and transverse ports 32.

Reinforcing means is connected to tube 22 to aid in transmitting torque from open end 24 to cone 8, and comprises a helical strip 34 of criss-cross open-mesh fabric, such as Dacron polyester, that is molded into the outside of tube 22. The fabric is criss-crossed so that torque may be transmitted in either closewise or counter-clockwise direction.

To aid in sealing cone 8 in the cervical canal 4, a flashing 36 extends between teeth 16. Flashing 36 is a thin membrane of the same material from which cone 8 is made and is formed in the molding process. Flashing 36 may form a line which extends axially along the surface of cone 8 between the teeth 16. Two such flashings 36 may be molded into the cone 8 and may be located 180° apart.

Mandrel means is provided and is positioned in tube 22 and cone 8 to hold them in a desired position during the initial insertion of the cannula 2 into the cervical canal 4. The mandrel means may comprise a stylus 38 made of a bendable metal and having a handle 40 and a pushing boss 42. In operation, stylus 38 is inserted into tube 22 and cone 8 of cannula 2 and is bent into the desired shape. Then the device is inserted into the cervical canal, and the connector cap 26 is rotated to transmit torque to cone 8 which is rotated to advance the cone into the cervical canal by means of the helical thread 14. The stylus 38 is left in place while the torque is being transmitted from connecting cap 26 to cone 8.

Figure 3:
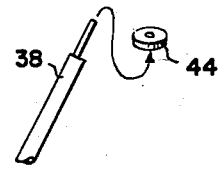
FIG. 3 is a partial view showing a disassembled stylus which may be used with the invention.

As shown in FIG. 3, stylus 38 may include a reduced end portion on which is mounted a ring 44 which is adapted to abut a transverse shoulder in the pointed end 10 of cone 8 to prevent any possibility of the end of the stylus penetrating past the end of the cone and accidentally injuring any body tissues.

Figure 2:
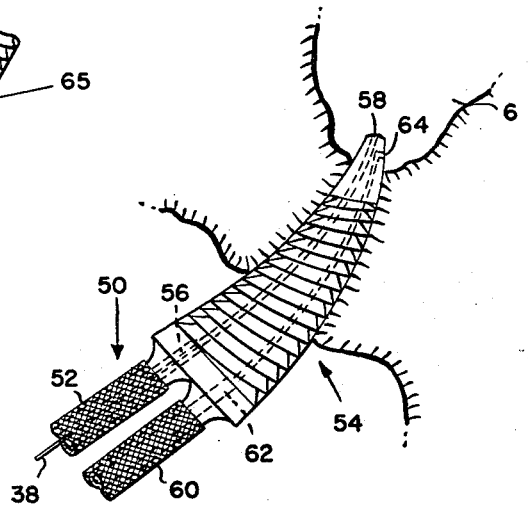
FIG. 2 is a partial view of another embodiment of the invention.

Turning to the embodiment of the invention illustrated in FIG. 2, there is shown a cannula 50 which is provided with a tube 52 that is connected to a cone 54 so as to provide a passageway 56 which terminates in an opening 58. Another tube 60 provides a passageway 62 which terminates in an opening 64. With cannula 50, a medication may be circulated into and from the cervical canal by feeding through tube 60 and returning through tube 52, for example.

Figure 4:
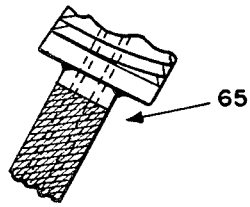
FIG. 4 is a partial view of another embodiment of the invention.

Instead of arranging two tubes side-by-side, they may be arranged concentrically, as shown in FIG. 4, to form a double lumen connector tube 65.

In operation, the cervix is dilated moderately and then the small tip of the cannula cone is inserted into the cervical canal with the aid of the bendable steel mandrel or obturator 38. After removing mandrel 38, moderate torque is applied to the open end of the tube, and the rotation of the screw thread causes the entire cone to be advanced into the canal. When the cannula has been advanced sufficiently into the canal to effect a tissue to cone seal, a gas, contrast liquid, or medication may be administered into the uterine cavity.

The cannula may be withdrawn by rotating the cone in the opposite direction.

The cervical cannula of the present invention is made of a soft rubber-like material, preferably a silicone elastomeric compound.

The tapered threads on the cone of the present invention serve to propel the cone into the soft cervical tissues causing dilation and sealing in a comfortable manner. Medication, contrast media, and gas may be injected through the cannula for many diagnostic or treatment procedures.

The flashing 36 is a thin membrane that is flexible, yet it seals leak-back around the threads.

The great flexibility and resiliency of my cervical cannula provides maximum patient comfort so that it may be tolerated for extended treatment periods.

The bendable metal stylus 38 assists in directing the entering cannula. However, it is not always needed.

The double passageways incorporated in the cannula of FIGS. 2 and 4 may be used to provide for circulation of medication, or to inject a contrast media and extract entrapped air simultaneously.

My cervical cannula may be cleaned easily. When molded of high temperature elastomeric such as silicone rubber, it may be repeatedly cleaned in an autoclave to insure a septic control.

What is claimed is:

1. A cervical cannula comprising a tapered cone made of flexible material and having a pointed end and a blunt end, thread means molded onto the cone for easy insertion of the cone into a cervical canal and for retention and sealing of the cone therein, said thread means including a helical thread having teeth extending along the cone, and a flashing is formed between teeth to aid in sealing the cannula to the cervical canal, a tube extending from the blunt end of the cone to an open end through which may be passed fluids, and an opening in the pointed end of the cone for passing said fluids into the cervical canal.

2. A cervical cannula comprising a tapered cone made of flexible material and having a pointed end and a blunt end, thread means molded onto the cone for easy insertion of the cone into a cervical canal and for retention and sealing of the cone therein, said thread means including a helical thread having teeth with front and rear faces extending along the cone, with the front faces of the teeth slanting toward the blunt end of the cone for easy insertion, and the rear faces of the teeth slanting toward the blunt end of the cone to aid in retention of the cone in the cervical canal, a tube extending from the blunt end of the cone to an open end through which may be passed fluids, and an opening in the pointed end of the cone for passing said fluids into the cervical canal.

3. The cannula according to claim 2 wherein mandrel means is provided which is positioned in said tube and cone to hold them in a desired position during insertion into the cervical canal.

4. The cannula according to claim 3 wherein the mandrel means comprises a stylus of bendable metal.

5. The cannula according to claim 2 wherein a second tube is connected to said cone and is provided with an opening in the pointed end of the cone, whereby the cannula may be used to circulate a medication feeding through one tube and returning through the other.

6. The cannula according to claim 2 wherein reinforcing means is connected to the tube to aid in transmitting torque from the open end of the tube to the cone.

7. The cannula according to claim 6 wherein the reinforcing means includes a helical strip of criss-cross open-mesh Dacron fabric molded into the outside of the tube.

8. The cannula according to claim 2 wherein the open end of the tube is provided with a metal cap having flattened outside surfaces for easier turning of the cap and tube.

9. The cannula according to claim 2 wherein the opening in the pointed end of the cone includes an axial port and a pair of transverse ports.

References Cited
UNITED STATES PATENTS

| | | | |
|---|---|---|---|
| 381,622 | 4/1884 | Healy | 128—241 |
| 419,926 | 1/1890 | Chapman | 128—349 |
| 430,137 | 6/1890 | Meddick | 128—343 |
| 1,888,349 | 11/1932 | Jacoby | 128—349 |
| 1,957,673 | 5/1934 | Sayre | 128—341 |
| 2,392,045 | 1/1946 | Hudgins | 128—127 |
| 2,893,395 | 7/1959 | Buck | 128—349 |

FOREIGN PATENTS

| | | |
|---|---|---|
| 1,158 | 1901 | Great Britain. |
| 185,005 | 9/1922 | Great Britain. |
| 709,568 | 5/1931 | France. |

DALTON L. TRULUCK, *Primary Examiner.*